(12) United States Patent
Fischer et al.

(10) Patent No.: US 8,678,522 B2
(45) Date of Patent: *Mar. 25, 2014

(54) ABRASION RESISTANT TRACK SHOE GROUSER

(71) Applicant: Caterpillar, Inc., Peoria, IL (US)

(72) Inventors: Keith D. Fischer, Roanoke, IL (US);
Mark S. Diekevers, Metamora, IL (US);
Curt D. Afdahi, Metamora, IL (US);
Kevin L. Steiner, Tremont, IL (US);
Christopher A. Barnes, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,127

(22) Filed: Mar. 22, 2013

(65) Prior Publication Data

US 2013/0221739 A1 Aug. 29, 2013

Related U.S. Application Data

(63) Continuation of application No. 12/616,204, filed on Nov. 17, 2009, now Pat. No. 8,424,980.

(60) Provisional application No. 61/116,989, filed on Nov. 21, 2008.

(51) Int. Cl.
*B62D 55/26* (2006.01)

(52) U.S. Cl.
USPC .......................... 305/179; 305/191; 305/192

(58) Field of Classification Search
USPC ......... 305/114, 178, 179, 180, 181, 191, 192, 305/198, 201; 29/891.1; 175/374; 75/236, 75/240, 252

See application file for complete search history.

(56) References Cited

U.S. PATENT DOCUMENTS

| 2,105,079 A | 1/1938 | Holslag |
| 2,549,930 A | 4/1951 | Riegel at al. |
| 2,849,259 A | 8/1958 | Engstrom |
| 2,874,005 A | 2/1959 | Engstrom |
| 3,060,307 A | 10/1962 | Arnoldy |
| 3,172,991 A | 3/1965 | Arnoldy |

(Continued)

FOREIGN PATENT DOCUMENTS

| JP | 02-006097 A | 1/1990 |
| JP | 06-049228 B2 | 6/1994 |

(Continued)

OTHER PUBLICATIONS

KIPO, Int'l Search Report for Int'l Application No. PCT/US2009/057629, Apr. 20, 2010, 2 pp.

(Continued)

*Primary Examiner* — Kip T Kotter
(74) *Attorney, Agent, or Firm* — Leydig, Voit & Mayer

(57) ABSTRACT

A track shoe for a track-type vehicle. The track shoe includes a base plate and a grouser projecting away from the base plate. A capping surface structure of substantially horseshoe shaped cross-section is disposed across a distal portion of the grouser. The capping surface structure covers portions of a distal edge surface and adjacent lateral surfaces. The capping surface structure is formed from an material characterized by enhanced wear resistance relative to portions of the grouser underlying the capping surface structure.

20 Claims, 10 Drawing Sheets

(56) References Cited

U.S. PATENT DOCUMENTS

| | | |
|---|---|---|
| 3,286,379 A | 11/1966 | Benetti |
| 3,405,247 A | 10/1968 | Hlivka |
| 3,790,353 A | 2/1974 | Jackson et al. |
| 3,882,594 A * | 5/1975 | Jackson et al. ............. 228/122.1 |
| 3,912,338 A | 10/1975 | Toews |
| 3,936,655 A | 2/1976 | Arnoldy |
| 3,972,570 A | 8/1976 | Massieon |
| 4,097,711 A | 6/1978 | Banerjee |
| 4,243,727 A | 1/1981 | Wisler et al. |
| 4,404,450 A | 9/1983 | Weldon |
| 4,434,642 A | 3/1984 | Rasmussen |
| 4,613,741 A | 9/1986 | Arnoldy |
| 4,723,060 A | 2/1988 | Arnoldy |
| 5,010,225 A | 4/1991 | Carlin |
| 5,111,600 A | 5/1992 | Lukavich et al. |
| 5,147,996 A | 9/1992 | Carlin |
| 5,516,053 A | 5/1996 | Hannu |
| 5,791,422 A | 8/1998 | Liang et al. |
| 6,017,103 A | 1/2000 | Villard |
| RE37,127 E | 4/2001 | Schader et al. |
| 6,360,832 B1 | 3/2002 | Overstreet et al. |
| 6,414,258 B1 | 7/2002 | Amano |
| 6,469,278 B1 | 10/2002 | Boyce |
| 6,564,884 B2 | 5/2003 | Bird |
| 6,571,493 B2 | 6/2003 | Amano et al. |
| 6,649,858 B2 | 11/2003 | Wakeman |
| 6,651,756 B1 | 11/2003 | Costo, Jr. et al. |
| 6,659,206 B2 | 12/2003 | Liang et al. |
| 7,163,754 B2 | 1/2007 | Revankar et al. |
| 7,666,244 B2 | 2/2010 | Lockwood et al. |
| 2004/0157066 A1 | 8/2004 | Arzoumanidis |
| 2008/0236333 A1 | 10/2008 | MacLeod |

FOREIGN PATENT DOCUMENTS

| | | |
|---|---|---|
| JP | 2001-47235 A | 2/2001 |
| JP | 2005-305449 A | 11/2005 |
| KR | 2000-0046435 A | 7/2000 |
| KR | 20-0396650 Y1 | 9/2005 |
| WO | WO 2007/011524 A1 | 10/2007 |

OTHER PUBLICATIONS

KIPO, Written Opinion for Int'l Application No. PCT/US2009/057629, Apr. 20, 2010, 5 pp.

KIPO, Int'l Search Report for Int'l Application No. PCT/US2009/057630, May 3, 2010, 3 pp.

KIPO, Written Opinion for Int'l Application No. PCT/US2009/057630, May 3, 2010, 7 pp.

* cited by examiner

ABRASION RESISTANT TRACK SHOE GROUSER

CROSS-REFERENCED TO RELATED APPLICATIONS

This patent application is a continuation of copending U.S. patent application Ser. No. 12/616,204, filed Nov. 17, 2009, which in turn claims benefit of U.S. Provisional Application No. 61/116,989, filed Nov. 21, 2008, and which is incorporated herein in its entirety by this reference.

STATEMENT REGARDING FEDERALLY SPONSORED RESEARCH AND DEVELOPMENT

This application claims benefit of U.S. Provisional Application No. 61/116,989 filed Nov. 21, 2008.

TECHNICAL FIELD

This disclosure relates generally to track-type vehicles and, more particularly, to a track shoe with at least one grouser incorporating a capping surface of enhanced abrasion resistance across the distal edge and adjacent lateral surfaces of the grouser.

BACKGROUND

In track-type machines, such as dozers, loaders, excavators and the like, the tracks may be covered by shoes incorporating outwardly projecting grousers which engage the ground and provide enhanced traction during use. As the grousers wear down, traction decreases. This decrease in traction gives rise to enhanced slippage when the machine is moving heavy loads. To compensate for such slippage, an operator may be required to reduce the average mass per load being transported. Over time, this correlates to a reduction in overall productivity. By way of example only, the overall productivity of a dozer having worn grousers may be reduced by about 30% relative to a dozer with new grousers. That is, in a given time, the dozer with worn grousers moves about 30% less material between two defined locations. This reduction in productivity is due to a reduction in the average mass that can be pushed by the machine without slipping as material is moved from point to point. Moreover, rapid wear of grousers requires more frequent replacement of the track shoes. Typical maintenance time for replacement of the track shoes on a dozer is about 8 hours. During this replacement period the machine is unavailable for work, thereby resulting in further productivity losses. Accordingly, premature wear of grousers is recognized as undesirable.

One approach to providing enhanced wear resistance to the grouser is set forth in U.S. Pat. No. 3,972,570 to Massieon having an issue date of Aug. 3, 1976. This reference advocates milling or machining a groove along the tip of the grouser and brazing an insert or a strip of a composite hard wear resistant alloy in the slot. It is also known to apply a wear resistant hardfacing treatment of material such as steel with embedded tungsten carbide particles across the upper face of the grouser.

SUMMARY

This disclosure describes, in one aspect, a track shoe for a track-type vehicle. The track shoe includes a base plate and a grouser projecting away from the base plate. The grouser includes a distal edge surface facing away from the base plate. The grouser further includes first and second lateral faces adjacent the distal edge surface. The track shoe further includes a capping surface structure of substantially horseshoe shaped cross-sectional profile. The capping surface structure includes a first covering segment disposed in covering relation to at least a portion of the first lateral face adjacent to the distal edge surface, a second covering segment disposed in covering relation to at least a portion of the second lateral face adjacent to the distal edge surface, and a third covering segment disposed at least partially across the distal edge surface. The capping surface structure is formed from a material characterized by enhanced wear resistance relative to the substrate material of the grouser underlying the capping surface structure.

In another aspect, this disclosure describes a method of enhancing wear resistance of a track shoe for a track-type vehicle. The track shoe includes a base plate and a grouser projecting away from the base plate. The method includes applying a capping surface structure in overlying relation to a distal portion of the grouser. A first covering segment is applied in covering relation to at least a portion of a first lateral face adjacent to a distal edge surface of the grouser and a second covering segment is applied in covering relation to at least a portion of a second lateral face adjacent to the distal edge surface. A third covering segment is applied at least partially across the distal edge surface between the first covering segment and the second covering segment to define a substantially horseshoe shaped cross section. Segments of the capping surface structure are formed from a material characterized by enhanced wear resistance relative to portions of the grouser substrate material face structure.

DETAILED DESCRIPTION

Figure 1:
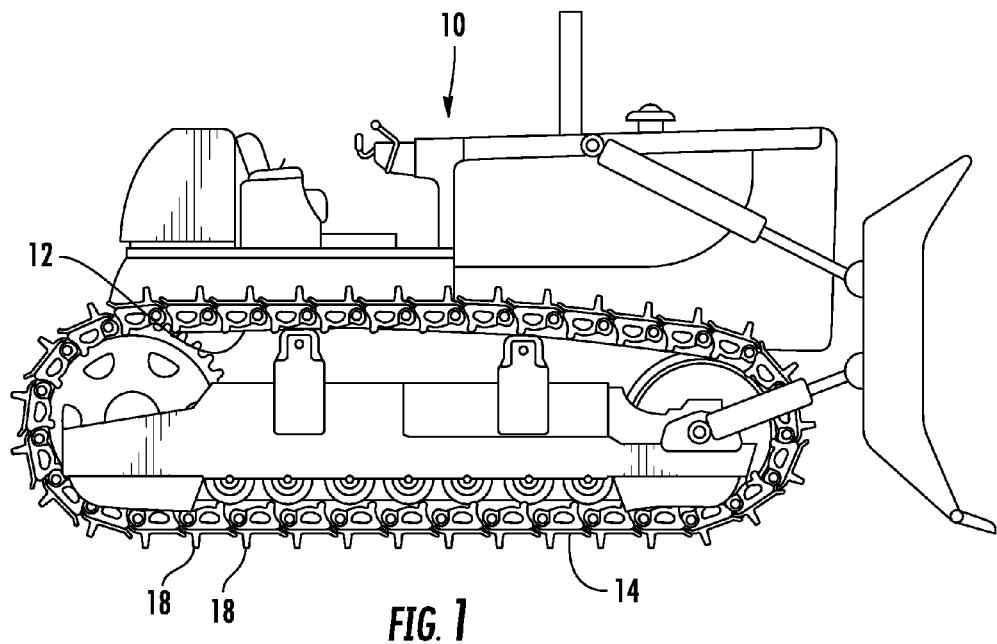
FIG. 1 is a diagrammatic side view of an exemplary track-type machine.

Reference will now be made to the drawings wherein, to the extent possible, like elements are designated by like reference numerals throughout the various views. FIG. 1 illustrates an exemplary machine 10 that performs some type of operation associated with an industry such as mining, construction, farming, transportation, or any other industry known in the art. The machine 10 includes a track 12 with an arrangement of track shoes 14 at the exterior of the track 12. The track shoes 14 are adapted to engage the ground during operation. The machine 10 may be an earth moving machine such as a dozer excavator, loader, or the like. However, the machine 10 may be any other track-type vehicle as may be desired.

Figure 2:
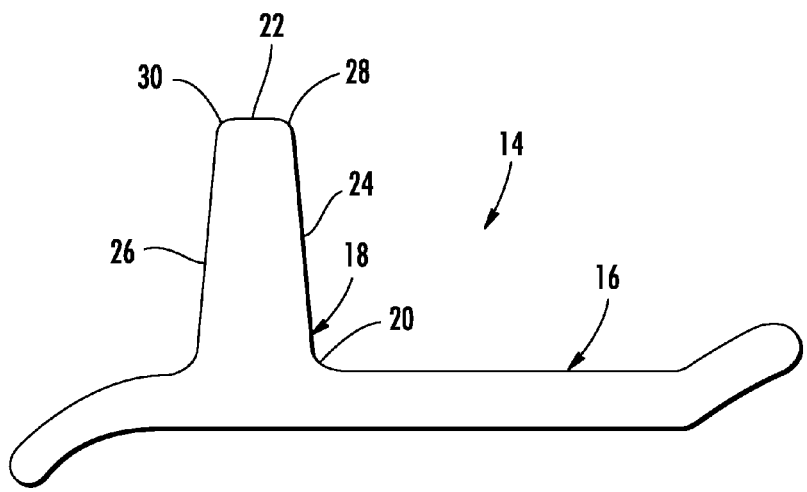
FIG. 2 is a diagrammatic side view of an exemplary track shoe for use on a track-type machine.

As illustrated in FIG. 2, an exemplary track shoe 14 may include a base plate 16 and a grouser 18 projecting away from the base plate 16. The grouser 18 normally extends across the base plate 16 so as to be oriented in substantially transverse relation to the travel direction of the track 12 during operation. As the track 12 moves, the grouser 18 digs into the ground and provides enhanced traction. In the illustrated exemplary construction, the grouser 18 is characterized by a generally pyramidal cross-section including a grouser base 20 in proximal relation to the base plate 16 and a distal edge surface 22 defining a relatively narrow width plateau in elevated relation to the grouser base. A first lateral face 24 and a second lateral face 26 extend in diverging, angled relation away from opposing perimeter edges the distal edge surface 22 towards the grouser base 20. The intersection between the distal edge surface 22 and the first lateral face 24 defines a first corner transition zone 28. The intersection between the distal edge surface 22 and the second lateral face 26 defines a second corner transition zone 30. The first corner transition zone 28 and/or the second corner transition zone 30 may be slightly rounded as illustrated or may incorporate sharp corners if desired. According to one formation practice, the track shoe 14 may be formed by a rolling operation applied to an ingot such that the base plate 16 and the grouser 18 are integrally formed from a common ductile material such as a plain machinable carbon steel or the like. As will be appreciated, while the use of ductile materials may aid in formation of the track shoe 14, such materials may also be susceptible to wear during use in an abrasive environment.

To counteract abrasive wear conditions, a capping surface structure 32 (FIG. 7) defining an abrasion resistant surface covering is disposed in covering relation to the distal edge surface 22 and adjacent portions of the first lateral face 24 and the second lateral face 26. In the exemplary construction illustrated in FIG. 7, the capping surface structure 32 includes a first covering segment 34 extending along the first lateral face 24, a second covering segment 36 extending along the second lateral face 26 and a third covering segment 38 oriented in substantially bridging relation across the distal edge surface 22 between the first covering segment 34 and the second covering segment 36. As shown, the first covering segment 34 and the second covering segment 36 intersect with the third covering segment 38 to define a substantially horseshoe shaped cross-sectional profile disposed in wrap-around capping relation to the distal edge surface 22 and adjacent portions of the first lateral face 24 and the second lateral face 26.

According to one exemplary practice, one or more segments of the capping surface structure 32 may be formed using hardfacing techniques wherein a heating device such as a torch, welding head or the like is used to form a liquid pool of molten metal across a surface of the grouser 18 and particles of a wear-resistant material such as cemented tungsten carbide or the like are deposited into the formed pool to yield a composite alloy of enhanced wear resistance when the pool resolidifies.

Figure 3:
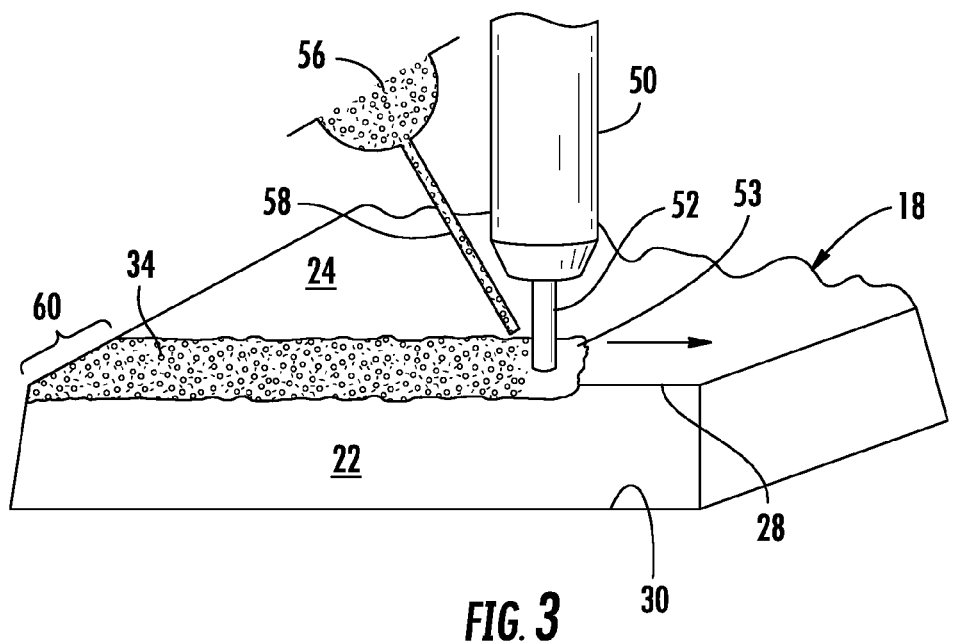
FIG. 3 is a diagrammatic view illustrating an exemplary hardfacing process for application of an abrasion resistant surface covering to a surface of a grouser or other work piece.

By way of example only, and not limitation, FIG. 3 illustrates one exemplary practice for application of an abrasion resistant surface covering across a surface of the grouser 18 using a hardfacing treatment. In this regard, it is to be appreciated that while FIG. 3 illustrates an exemplary technique for application of the first covering segment 34 across portions of the first lateral face 24, similar application techniques may likewise be used for application of the second covering segment 36 and/or the third covering segment 38 as may be desired. As shown, during the exemplary hardfacing treatment, the surface being treated may be positioned in generally opposing relation to a welding head 50 including an electrode 52 of consumable mild steel wire or the like. As an arc is developed between the welding head 50 and the opposing surface, the electrode 52 is liquefied and forms a liquid pool 53. A portion of the underlying substrate material may also undergo melting to a relatively shallow depth, thereby providing additional liquid to the liquid pool 53. The liquid pool 53 may be developed progressively by moving the welding head 50 relative to the surface being treated indicated by the directional arrow. Of course, it is also contemplated that the welding head 50 may remain stationary with relative movement of the grouser 18 if desired.

Although the use of the welding head 50 with an electrode 52 of consumable character may be beneficial in many environments of use, it is contemplated that virtually any localized heating technique may be used to form the liquid pool 53 across the surface being treated. By way of example only, the electrode 52 may be of non-consumable character such that the weld pool is formed exclusively from the material forming the surface of the grouser 18. Likewise, a torch or other heating device may be used in place of the welding head 50 either with or without a consumable member. Accordingly, the formation of the liquid pool 53 is in no way dependent upon the use of any particular equipment or process.

Regardless of the technique used for formation of the liquid pool, particles 56 of wear resistant material are delivered to the liquid pool 53 for development of a wear resistant composite alloy upon resolidification of the liquid pool 53. By way of example only, and not limitation, one suitable material for the particles 56 is cemented tungsten carbide bonded together with cobalt. One potentially useful source of suitable particles 56 is cemented tungsten carbide recovered from ground drill bits used in machining operations. However, other materials may likewise be utilized if desired. Accordingly, it is contemplated that at least a portion of the particles 56 may be formed from other materials including, without limitation, cast tungsten carbide, macrocrystalline tungsten carbide, as well as carbides of other metals including molybdenum, chromium, vanadium, titanium, tantalum, beryllium, columbium, and blends thereof characterized by enhanced wear resistance relative to the substrate material forming the grouser 18. Upon resolidification, the resultant abrasion resistant surface covering includes the particles 56 of the wear-resistant material within a matrix of steel or other base metal that previously formed the liquid pool 53.

During the hardfacing treatment, the liquid pool 53 is disposed at a relatively localized position and remains in a liquid state for a limited period of time before resolidification takes place. Thus, it is advantageous to deliver the particles 56 in conjunction with formation of the liquid pool 53. By way of example only, and not limitation, one exemplary particle delivery practice may utilize a drop tube 58 of substantially hollow construction which moves along a path generally behind the welding head 50. The particles 56 are typically applied at a level of about of about 0.1 to about 0.3 grams per square centimeter of the treatment zone, although higher or lower levels may be used if desired.

Figure 4:
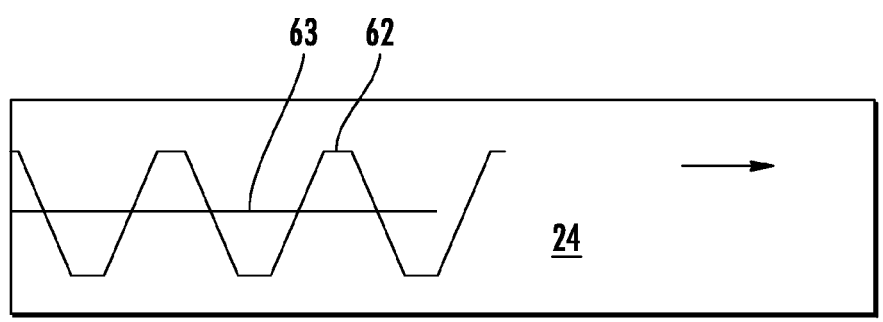
FIG. 4 is a diagrammatic view illustrating an exemplary pattern for application of a hardfacing treatment to a surface of a grouser or other work piece.
Figure 5:
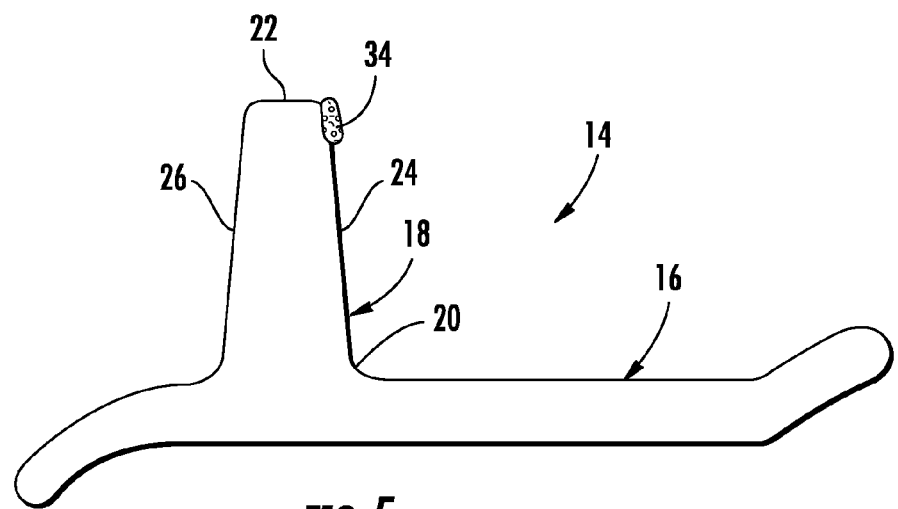
FIGS. 5-7 are sequential diagrammatic views illustrating an exemplary sequence for building a capping surface structure about a tip portion of a grouser.

The treatment zone width 60 provided by a pass of the welding head 50 and the drop tube 58 may be controlled by the pattern of movement of the welding head 50. In the event that a relatively narrow treatment zone width 60 is desired, the welding head 50 may move in a substantially straight line with the drop tube 58 following directly behind. Such a straight line pattern may typically be used to yield a treatment zone width 60 of about 15 millimeters or less. In the event that a wider treatment zone width is desired, the welding head may be moved in a generally zigzag pattern 62 such as is shown in FIG. 4 with the drop tube 58 trailing in a generally straight line 63 along the middle of the zigzag pattern 62. The zigzag pattern 62 provides a wider liquid pool 53 for acceptance of the particles 56 which may be deposited at the midpoint of the formed pool. In the event that a more extensive treatment zone width is desired, the welding head 50 may make multiple passes in adjacent relation to one another to substantially cover any portion of the surface as may be desired.

During the hardfacing procedure, surface tension characteristics cause the liquid pool 53 to form a generally convex raised bead across the surface of the treatment zone. The introduction of the particles 56 may tend to enhance the volume of this raised bead. This raised bead structure is generally retained upon resolidification of the abrasion resistant surface covering. By way of example only, the final solidified abrasion resistant surface covering may be raised about 4 millimeters relative to the plane of the treated surface and extend to a depth of about 2 millimeters below the plane of the treated surface due to melting of the base material. However, these levels may be increased or decreased as desired.

Figure 6:
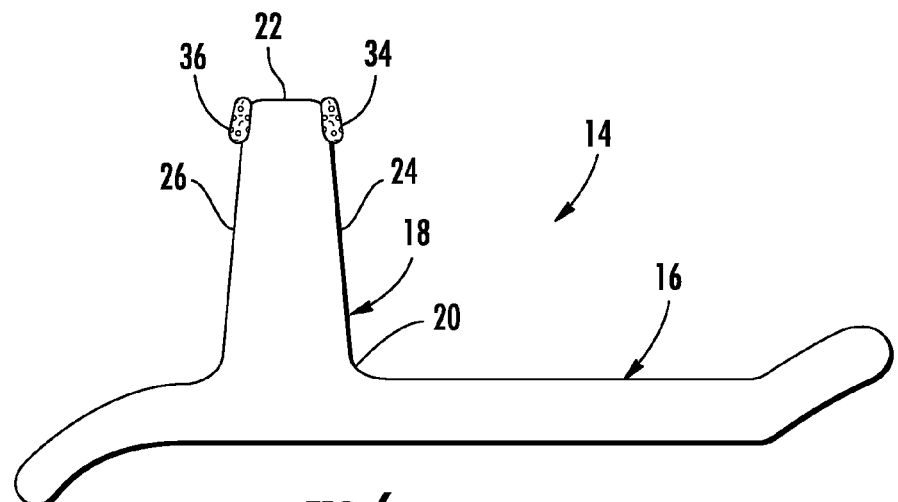

Referring jointly to FIGS. 3 and 5-7, according to one exemplary procedure, a first phase of forming the capping surface structure 32 along the tip of the grouser 18 may involve applying the first covering segment 34 along the first lateral face 24 in adjacent relation to the distal edge surface 22 as illustrated in FIG. 3. As shown, the first covering segment projects outwardly from the surface of the first lateral face 24 and to a position at least partially covering the first corner transition zone 28 (FIG. 2). As shown in FIG. 6, a second phase of forming the capping surface structure 32 may involve applying the second covering segment 36 along the second lateral face 26 in adjacent relation to the distal edge surface 22. The second covering segment 36 projects outwardly from the surface of the second lateral face 26 and to a position at least partially covering the second corner transition zone 30 (FIG. 2). As best seen through reference to FIG. 7, a third phase of forming the capping surface structure 32 may involve applying the third covering segment 38 along the distal edge surface 22 in bridging relation to the previously formed first covering segment 34 and second covering segment 36. The first covering segment 34, the second covering segment 36 and the third covering segment 38 thus cooperatively define the capping surface structure 32 of generally horseshoe shaped cross-sectional configuration. As best seen in FIG. 8, the capping surface structure 32 may be substantially continuous along the length of the grouser 18. However, the capping surface structure 32 may likewise be discontinuous along the length of the grouser 18 if desired.

In practice, the first covering segment 34 and the second covering segment 36 extend an effective distance downwardly towards the grouser base 20 to provide coverage to portions of the first lateral face 24 and the second lateral face 26 engaging rocks and other abrasive structures at or near the surface of the ground during use. By way of example only, and not limitation, extending the first covering segment 34 and the second covering segment 36 a distance of about 6 millimeters to about 30 millimeters downwardly from the distal edge surface may be useful in many applications. Extending the first covering segment 34 and the second covering segment 36 a distance of about 6 millimeters to about 15 millimeters downwardly from the distal edge surface may be particularly desirable in many applications, although greater or lesser distances may be used if desired.

It has been found that the first covering segment 34 and the second covering segment 36 typically may be formed by using straight line movement of the welding head 50 in substantially adjacent, parallel relation to the first corner transition zone 28 and to the second corner transition zone 30 respectively. The third covering segment 38 typically may be formed using a single pass of the welding head 50 following a zigzag pattern 62 as shown in FIG. 4. However, multiple passes may be used on any surface if additional coverage is desired.

Figure 7:
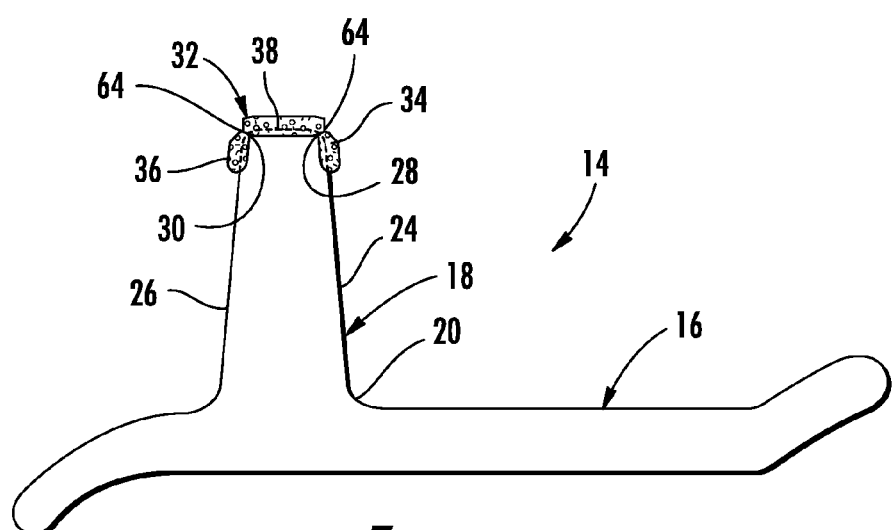
Figure 8:
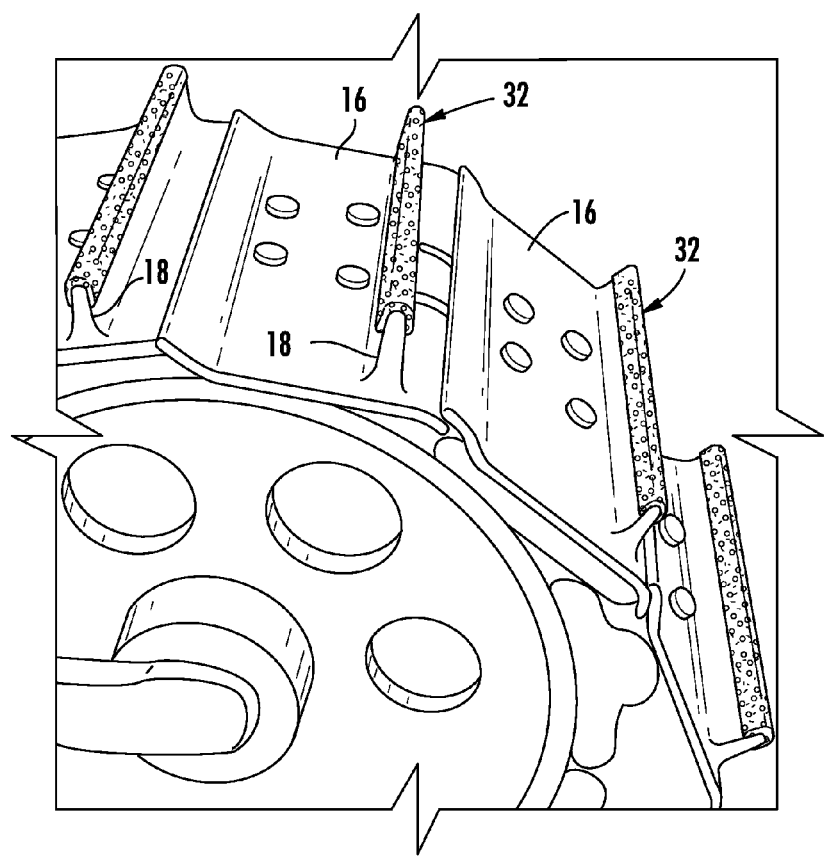
FIG. 8 is a diagrammatic perspective view illustrating track shoes on a machine with an applied capping surface structure of abrasion resistant material in covering relation to tip portions of the grousers.
Figure 9:
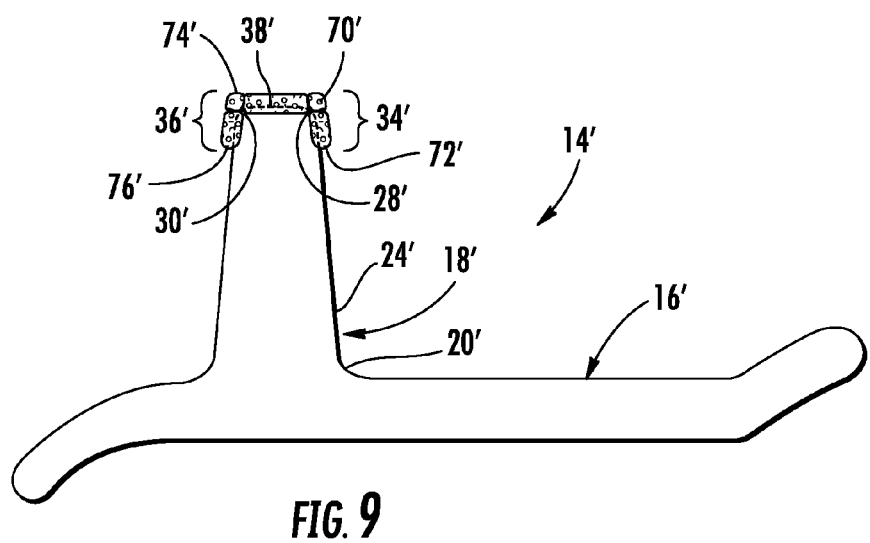
FIG. 9 is a diagrammatic view similar to FIG. 7 illustrating an alternative configuration for a capping surface structure of abrasion resistant material about a tip portion of a grouser.

In the configuration illustrated in FIG. 7, crevices 64 may extend along the intersections between the covering segments at positions generally above the corner transitions. By way of example only, and not limitation, FIG. 9 illustrates an alternative configuration wherein elements corresponding to those previously described are designated by like reference numerals with a prime. In this configuration, the first covering segment 34' is of multi-sectioned construction including a first corner cover section 70' disposed generally over the first corner transition zone 28' and a cooperating first lateral face cover section 72'. Each of the first corner cover section 70' and the first lateral face cover section 72' may be formed by a discrete hardfacing pass or other suitable technique. Likewise, the second covering segment 36' is of multi-sectioned construction including a second corner cover section 74' disposed generally over the second corner transition zone 30' and a cooperating second lateral face cover section 76'. Each of the second corner cover section 74' and the second lateral face cover section 76' may be formed by a discrete hardfacing pass or other suitable technique. The first covering segment 34' and the second covering segment 36' cooperate with the third covering segment 38' to define a substantially horseshoe shaped cross-sectional profile. It is contemplated that multi-sectioned configurations may be beneficial in providing enhanced protection to corners or other defined regions. Accordingly, while various covering segments of unitary construction may be useful for many applications, the use of multiple sections in adjacent relation to one another may likewise be utilized if desired. Thus, it is contemplated that any of the covering segments may be made up of single or multiple sections that cooperatively define a generally horseshoe shaped cross-section.

Benefits associated with introducing wear resistant material in covering relation to the distal edge and lateral surfaces of a grouser may be understood through reference to the following non-limiting working examples 1-8. In each of the examples, selected surfaces of a grouser on a track shoe for a CATERPILLAR® D10 bulldozer were treated with an abrasion resistant material applied by hardfacing techniques to provide either a horseshoe pattern covering substantially as shown and described in relation to FIG. 7 or, alternatively, a covering across the distal edge only. The abrasion resistant material utilized cemented tungsten carbide particles with a size range of +14-24 mesh applied in a hardfacing procedure at a drop rate of 250 grams per minute using a weld head with a wire speed of 350 inches per minute, a travel speed of 10.8 inches per minute and a voltage of 29 volts. The track shoe was then used on one track of the bulldozer in a defined environment until the grouser was worn down to a height of about 1.5 inches thereby corresponding to a level typically requiring track shoe replacement. The hours worked before replacement was required were then compared to the replacement hours for untreated track shoes used on the other track of the same machine. In each of examples 1, 3, 5 and 7 the abrasion resistant material was applied in a pattern corresponding to the configuration illustrated in FIG. 7 with such material substantially covering the distal edge surface and extending a distance of approximately 30 millimeters downwardly from the distal edge surface along the adjacent lateral faces towards the track shoe base to form a substantially horseshoe profile. In each of examples 2, 4, 6, and 8 the same abrasion resistant material was applied by the same hardfacing procedure at the same thickness in complete covering relation to the distal edge surface but without coverage along adjacent lateral surfaces. Such coverage exclusively across the distal edge surface is consistent with current industry practice.

Examples 1 and 2

The test procedures as outlined above were carried out on a machine operated at a location in Arizona, USA, characterized by igneous rock ground cover.

| Example No. | Treated Surfaces | Increased Life Relative To Untreated |
|---|---|---|
| 1 | Distal Edge And Adjacent Faces | 34% |
| 2 (Comparative) | Distal Edge Only | 6% |

Examples 3 and 4

The test procedures as outlined above were carried out on a machine operated at a location in Nevada, USA, characterized by igneous rock ground cover.

| Example No. | Treated Surfaces | Increased Life Relative To Untreated |
|---|---|---|
| 3 | Distal Edge And Adjacent Faces | 55% |
| 4 (Comparative) | Distal Edge Only | 16% |

Examples 5 and 6

The test procedures as outlined above were carried out on a machine operated at a location in Kentucky, USA, characterized by sandstone ground cover.

| Example No. | Treated Surfaces | Increased Life Relative To Untreated |
|---|---|---|
| 5 | Distal Edge And Adjacent Faces | Greater Than 100% |
| 6 (Comparative) | Distal Edge Only | 56% |

Examples 7 and 8

The test procedures as outlined above were carried out on a machine operated at a location in West Virginia, USA, characterized by sandstone ground cover.

| Example No. | Treated Surfaces | Increased Life Relative To Untreated |
|---|---|---|
| 7 | Distal Edge And Adjacent Faces | Greater Than 100% |
| 8 (Comparative) | Distal Edge Only | 14% |

In each of the test environments the grousers provided with abrasion resistant material across the distal edge and adjacent surfaces displayed increased life substantially beyond untreated grousers and well beyond grousers having equivalent abrasion resistant material applied across the distal edge only. As noted previously, the overall productivity of a dozer having worn grousers may be reduced by about 30% relative to a dozer with new grousers. That is, in a given time, the dozer with worn grousers moves about 30% less material between two defined locations. Thus, prolonging the useful life of the most distal portion of the grousers correlates directly to improved productivity of the machine.

While working examples 1-8 above demonstrate the substantial benefits of applying an abrasion resistant surface covering across the distal edge surface 22 and the adjacent first lateral face 24 and second lateral face 26, it is contemplated that further benefits may be achieved by modifying the abrasion resistant surface covering to incorporate a significant weight percentage of particles 56 characterized by a relatively small effective diameter in combination with particles 56 characterized by a relatively large effective diameter to promote an enhanced packing factor of such particles in the final solidified structure. In this regard, it is to be understood that the term "packing factor" refers to the ratio of the volume of the composite alloy occupied by the applied particles in the solidified state relative to the total volume of the abrasion resistant surface covering. Thus, an abrasion resistant surface covering in which the applied particles occupy 50% of the total volume will have a packing factor of 0.50.

Figure 10:
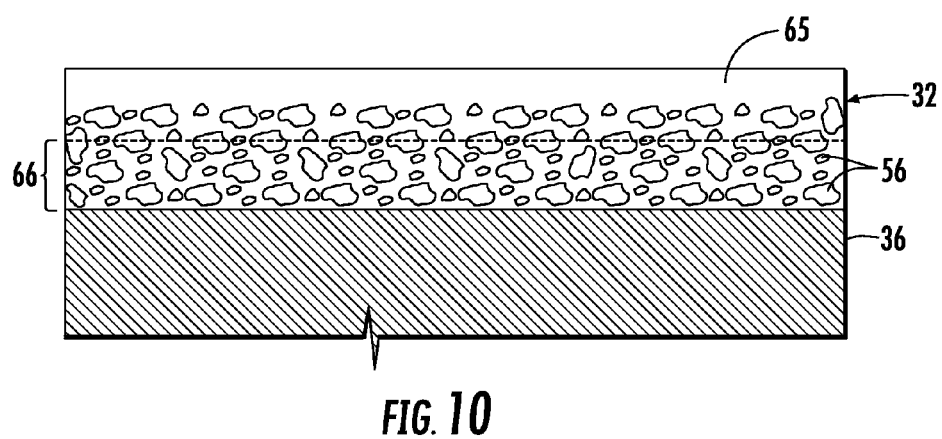
FIG. 10 is a diagrammatic view of a cross-section of an applied abrasion resistant surface covering overlying a grouser surface.

According to one practice which may be used to evaluate packing factor, one or more cross-sections may be cut through the capping surface structure 32 and the underlying portion of the grouser 18 as shown diagrammatically in FIG. 10. As shown, the particles 56 are concentrated in a band extending away from the grouser 18. At the time of formation, an outer zone 65 having very few particles may be disposed at the extreme outer surface. This outer zone 65 is formed substantially from the matrix material generated by the melting electrode 52. As will be appreciated, when subjected to an abrasive environment, the outer zone 65 may tend to exhibit initial rapid wear until a zone having an enhanced concentration of particles 56 becomes exposed. Thereafter, wear is substantially reduced. FIGS. 11-14 present micrographs of applied capping surface structures showing representative orientations corresponding substantially to FIG. 10. The boxes in FIGS. 11 and 13 extend generally from the underlying work piece to the lower edge of the outer zone, thereby illustrating the concentration of particles in that region.

The cross sections may be etched and polished to display the particles 56 within the matrix. A measurement zone 66 may then be defined within the etched and polished surface. The ratio of the surface area occupied by the particles 56 within the measurement zone 66 to the total area of the measurement zone 66 defines an area occupancy ratio which may be used as a measurement of the packing factor. By way of example only, evaluating the surface area occupied by the particles 56 in a standardized measurement zone extending from the surface of the grouser 18 to a position about 3 millimeters above the surface of the grouser 18 may be useful in evaluating the packing factor in portions of the capping surface structure 32 adjacent to the surface of the grouser 18 having high concentrations of particles 56. Although a single sample may be used, enhanced accuracy may be achieved by evaluating multiple samples and averaging the area occupancy ratios in those samples.

According to one exemplary practice, the particles 56 of wear resistant material may be of fractal dimensionality characterized by an effective diameter in the range of about +14-120 mesh. That is, the particles will be small enough to pass through a U.S. Standard 14 mesh screen and will be blocked from passing through a U.S. Standard 120 mesh screen. Within this broad range, it may be desirable for significant percentages of particles to occupy sub-ranges to provide a diverse population of particle sizes. Such a diverse particle size distribution permits smaller particles to cooperatively fill spaces between the larger particles to enhance the overall packing factor. By way of example only, one exemplary size distribution for the applied particles 56 is set forth in Table I below.

TABLE I

| Effective Diameter (Mesh) | Wt. % |
| --- | --- |
| +14-22 | 40%-70% |
| +22-32 | 10%-25% |
| +32-60 | 10%-25% |
| +60-120 | 3%-10% |

Utilization of such a particle size distributions within these ranges yields final packing factors of about 0.6 to about 0.7.

A size distribution for applied particles of wear resistant material which may be particularly desirable for some applications is set forth in Table II below.

TABLE II

| Effective Diameter (Mesh) | Wt. % |
| --- | --- |
| +14-22 | 65% |
| +22-32 | 15% |
| +32-60 | 15% |
| +80-120 | 5% |

Utilization of such a particle size distribution yields final packing factors of about 0.7.

If desired, it is contemplated that the exemplary size distributions may be adjusted to substantially reduce or eliminate particles in the +14-22 mesh range thereby shifting the distribution towards smaller effective diameters corresponding to higher mesh numbers. However, in general, it may be desirable for many applications that at least 40% by weight of the particles have an effective diameter large enough to be blocked by a 32 mesh screen. The presence of such larger particles may provide additional stability in highly abrasive environments such as may be present if the grouser 18 engages quarts, igneous rock, slag or other similar media of significant abrasive character. It is also contemplated that minor percentage of particles having an effective diameter greater than 14 mesh or smaller than 120 mesh may be applied if desired. However, in some applications it may be useful for about 95% or more by weight of the particles to be within the +14-120 mesh range.

Features consistent with the utilization of a broad particle range may be readily understood through reference to the following non-limiting examples.

Example 9

Figure 11:
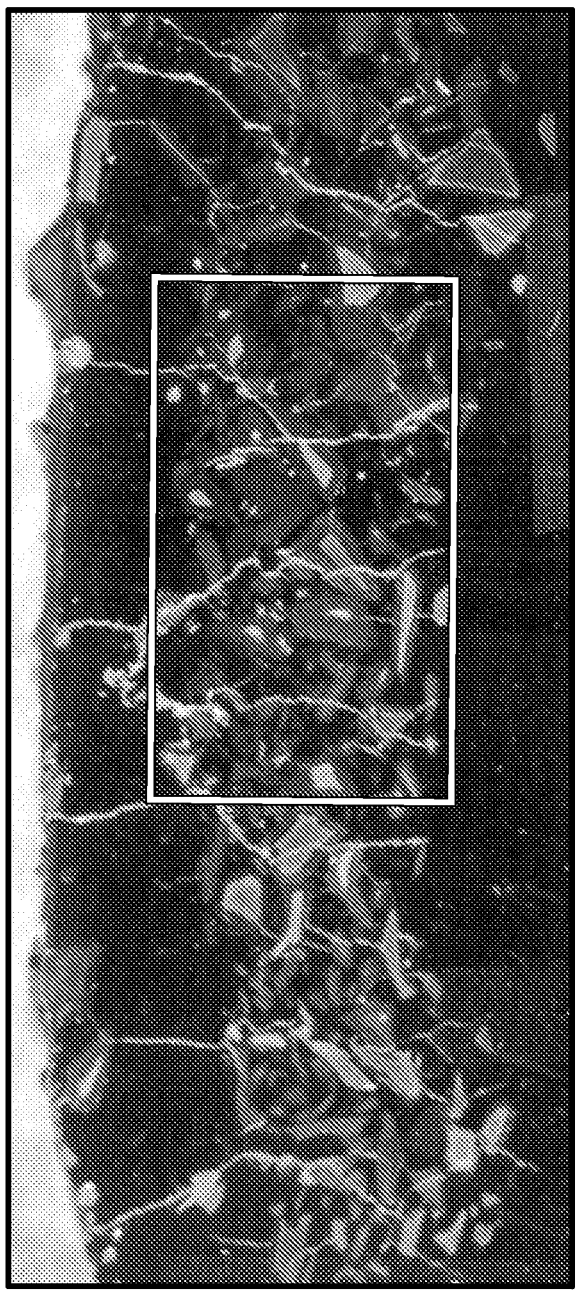
FIG. 11 is a micrograph showing a section view of an applied abrasion resistant surface covering incorporating particles within a first size distribution.
Figure 12:
FIG. 12 is a micrograph showing a portion of the section view of FIG. 11 at enhanced magnification.
Figure 13:
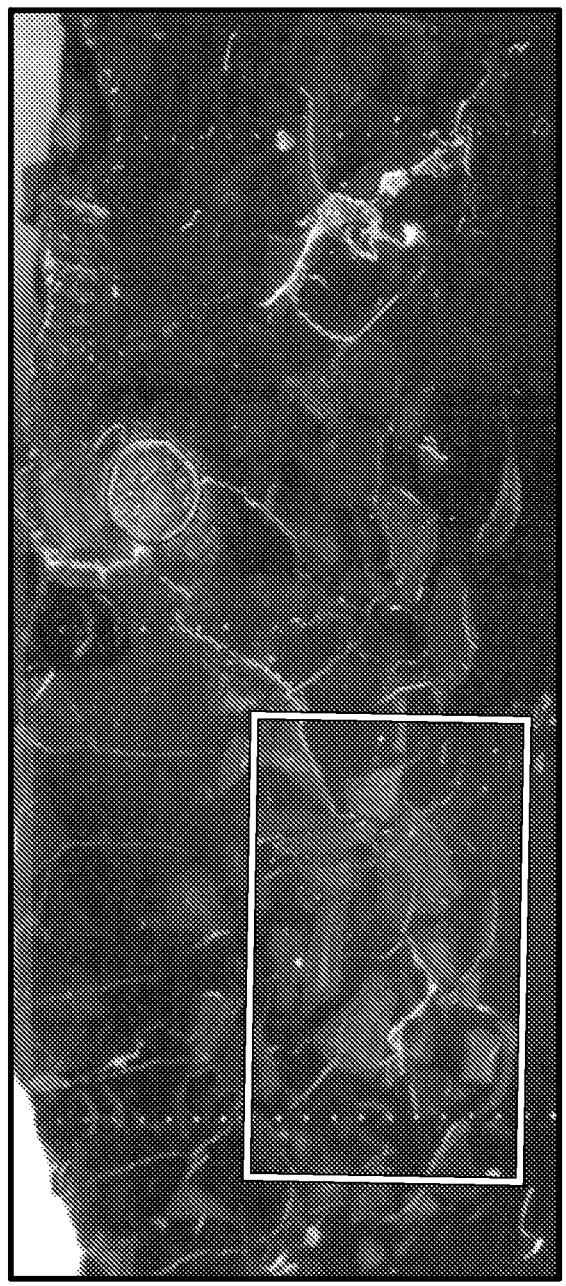
FIG. 13 is a micrograph showing a section view of an applied abrasion resistant surface covering incorporating particles within a second size distribution at the same magnification as FIG. 11.
Figure 14:
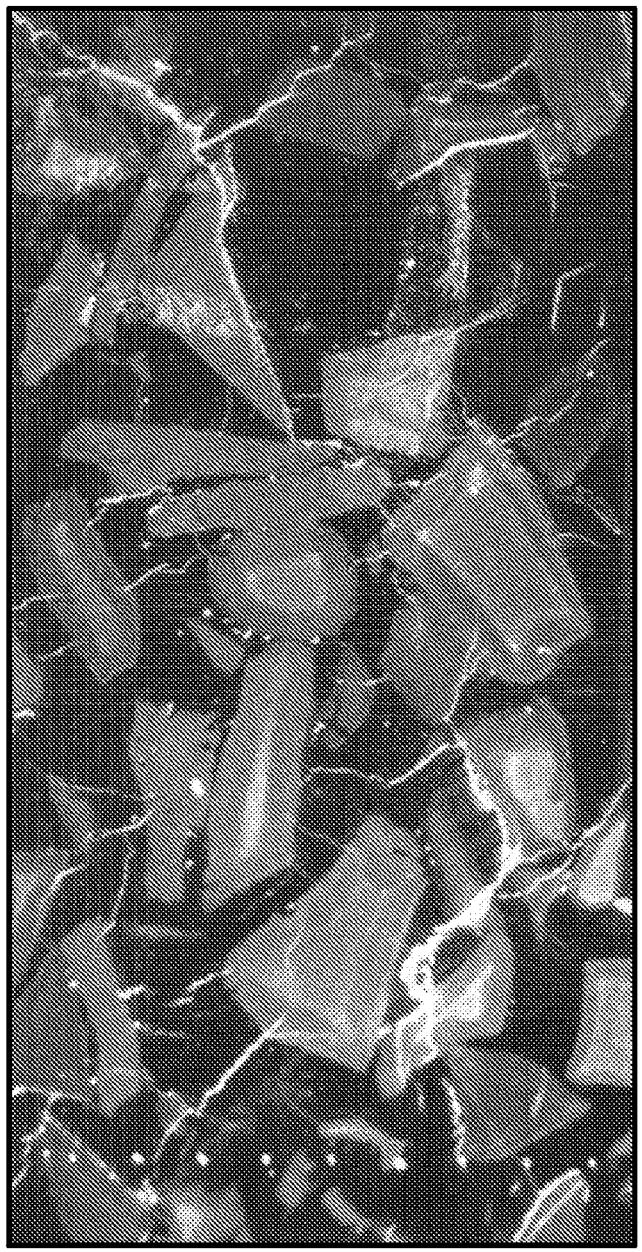
FIG. 14 is a micrograph showing a portion of the section view of FIG. 13 at the same magnification as FIG. 12.

FIGS. 11 and 12 are cross-sectional micrographs of an abrasion resistant surface covering of tungsten carbide particles within a steel matrix utilizing cemented tungsten carbide particles with a size range of +14-120 mesh. The abrasion resistant material utilized cemented tungsten carbide particles with a size range of +14-120 mesh. Approximately 64% by weight of the applied particle mass was in the size range +14-22 mesh. Approximately 16% by weight of the applied particle mass was in the size range +22-33 mesh. Approximately 16% by weight of the applied particle mass was in the size range +33-60 mesh. Approximately 4% by weight of the applied particle mass was in the size range +60-120 mesh. The particles were applied in a hardfacing procedure at a drop rate of 350 grams per minute using a weld head with a wire speed of 350 inches per minute, a travel speed of 10.8 inches per minute and a voltage of 29 volts. Based on relative area occupancy, the packing factor of the tungsten carbide particles was in the range of 0.6 to 0.7.

Example 10

Comparative

The procedures as outlined in Example 9 were repeated in all respects except that the abrasion resistant material utilized cemented tungsten carbide particles with a size range of +14-24 mesh. The resultant abrasion resistant surface covering of tungsten carbide particles within a steel matrix is shown in the micrographs at FIGS. 12 and 13. Based on relative area occupancy, the packing factor of the tungsten carbide particles was in the range of 0.4 to 0.5.

INDUSTRIAL APPLICABILITY

A track shoe including a grouser with a capping surface structure consistent with the present disclosure may find application in virtually any track-type vehicle using tracks to engage the ground during movement. By way of example only, and not limitation, such track-type vehicles may include crawler-type bulldozers, rippers, pipelayers, loaders, excavators and the like. The track shoe defines a ground-engaging surface at the exterior of a track. The capping surface structure provides enhanced abrasion resistance across the distal edge and adjacent lateral surfaces of the grouser thereby prolonging useful life and overall machine productivity.

What is claimed is:

1. A track shoe for a track-type machine, the track shoe comprising:
   a base plate;
   a grouser projecting away from said base plate, said grouser including a distal edge surface facing away from said base plate, said grouser further including a first lateral face extending away from said distal edge surface and a second lateral face extending away from said distal edge surface; and
   a capping surface structure including a first covering segment disposed in covering relation to at least a portion of said first lateral face adjacent to said distal edge surface, and a second covering segment disposed at least partially across said distal edge surface, said capping surface structure being formed from a material characterized by enhanced wear resistance relative to portions of said grouser underlying said capping surface structure, and wherein the material forming said capping surface structure is a composite of tungsten carbide particles embedded within a ferrous metal matrix at a packing factor of not less than about 0.6 as measured by area occupancy ratio of the tungsten carbide particles within a defined measurement zone within the capping surface structure.

2. The track shoe for a track-type machine as recited in claim 1, wherein about 3 to about 10 percent by weight of said tungsten carbide particles are characterized by an effective diameter small enough to pass through a 60 mesh screen prior to introduction to the ferrous metal matrix.

3. The track shoe for a track-type machine as recited in claim 2, wherein not less than about 40 percent by weight of said tungsten carbide particles are characterized by an effective diameter large enough to be blocked by a 32 mesh screen prior to introduction to the ferrous metal matrix.

4. The track shoe for a track-type machine as recited in claim 1, wherein not less than about 3 percent by weight of said tungsten carbide particles are characterized by an effective diameter small enough to pass through a 60 mesh screen prior to introduction to the ferrous metal matrix.

5. The track shoe for a track-type machine as recited in claim 4, wherein not less than about 40 percent by weight of said tungsten carbide particles are characterized by an effective diameter large enough to be blocked by a 32 mesh screen prior to introduction to the ferrous metal matrix.

6. The track shoe for a track-type machine as recited in claim 5, wherein said tungsten carbide particles are characterized by a size distribution in the range of about 14 to about 120 mesh prior to introduction to the ferrous metal matrix.

7. The track shoe for a track-type machine as recited in claim 1, wherein not less than about 40 percent by weight of said tungsten carbide particles are characterized by an effective diameter large enough to be blocked by a 32 mesh screen prior to introduction to the ferrous metal matrix.

8. The track shoe for a track-type machine as recited in claim 7, wherein said tungsten carbide particles are characterized by a size distribution in the range of about 14 to about 120 mesh prior to introduction to the ferrous metal matrix.

9. The track shoe for a track-type machine as recited in claim 1, wherein said tungsten carbide particles are characterized by a size distribution in the range of about 14 to about 120 mesh prior to introduction to the ferrous metal matrix.

10. The track shoe for a track-type machine as recited in claim 1, wherein the capping surface structure includes a third covering segment disposed in covering relation to at least a portion of said second lateral face adjacent to said distal edge surface.

11. The track shoe for a track-type machine as recited in claim 10, wherein each of said first covering segment and said third covering segment is of unitary construction.

12. The track shoe for a track-type machine as recited in claim 11, wherein said second covering segment extends in bridging relation between said first covering segment and said third covering segment.

13. The track shoe for a track-type machine as recited in claim 10, wherein at least one of said first covering segment and said third covering segment is of multisectional construction.

14. The track shoe for a track-type machine as recited in claim 13, wherein said second covering segment extends in bridging relation between said first covering segment and said third covering segment.

15. A method of enhancing wear-resistance of a track shoe for a track-type machine, the track shoe including a base plate, a grouser projecting away from said base plate, said grouser including a distal edge surface facing away from said base plate, said grouser further including a first lateral face extending in a first plane in angled relation away from said distal edge surface and a second lateral face extending in a second plane in angled relation away from said distal edge surface, the method comprising:

applying a capping surface structure to a distal portion of said grouser, said capping structure including a first covering segment disposed in covering relation to at least a portion of said first lateral face adjacent to said distal edge surface and a second covering segment disposed at least partially across said distal edge surface, said capping surface structure being formed from a material characterized by enhanced wear resistance relative to portions of said grouser underlying said capping surface structure, wherein the material forming said capping surface structure is a composite of tungsten carbide particles embedded within a ferrous metal matrix at a packing factor of not less than about 0.6 as measured by area occupancy ratio of the tungsten carbide particles within a defined measurement zone within the capping surface structure, the defined measurement zone extending from a surface of the grouser to a position about 3 mm above the surface of the grouser.

16. The method as recited in claim 15, wherein not less than about 40 percent by weight of said tungsten carbide particles are characterized by an effective diameter large enough to be blocked by a 32 mesh screen prior to introduction to the ferrous metal matrix.

17. The method as recited in claim 15, wherein about 3 to about 10 percent by weight of said tungsten carbide particles are characterized by an effective diameter small enough to pass through a 60 mesh screen prior to introduction to the ferrous metal matrix.

18. The method as recited in claim 15, wherein not less than about 3 percent by weight of said tungsten carbide particles are characterized by an effective diameter small enough to pass through a 60 mesh screen prior to introduction to the ferrous metal matrix.

19. The method as recited in claim 18, wherein not less than about 40 percent by weight of said tungsten carbide particles are characterized by an effective diameter large enough to be blocked by a 32 mesh screen prior to introduction to the ferrous metal matrix.

20. The method as recited in claim 19, wherein said tungsten carbide particles are characterized by a size distribution in the range of about 14 to about 120 mesh prior to introduction to the ferrous metal matrix.

\* \* \* \* \*